March 15, 1932.    B. DICK    1,849,076

HOSE FITTING

Filed Oct. 25, 1928

Inventor
Burns Dick
By E. E. Huffman
Att'y.

Patented Mar. 15, 1932

1,849,076

UNITED STATES PATENT OFFICE

BURNS DICK, OF ST. LOUIS, MISSOURI, ASSIGNOR TO WAGNER ELECTRIC CORPORATION, OF ST. LOUIS, MISSOURI, A CORPORATION OF DELAWARE

HOSE FITTING

Application filed October 25, 1928. Serial No. 314,915.

My invention relates to a hose fitting particularly designed for use as a coupling device in the lines of fluid operated braking apparatus. The object is to produce a fitting which may be economically made and applied, and which will form a connection with the hose which will be fluid tight under high pressure and will satisfactorily meet the other service conditions of braking apparatus for vehicles.

My improved fitting is particularly useful in connection with hose of small bore and small diameter and in which no internal spring or other resilient member is employed to distribute bending stresses in the hose.

Figure 1:
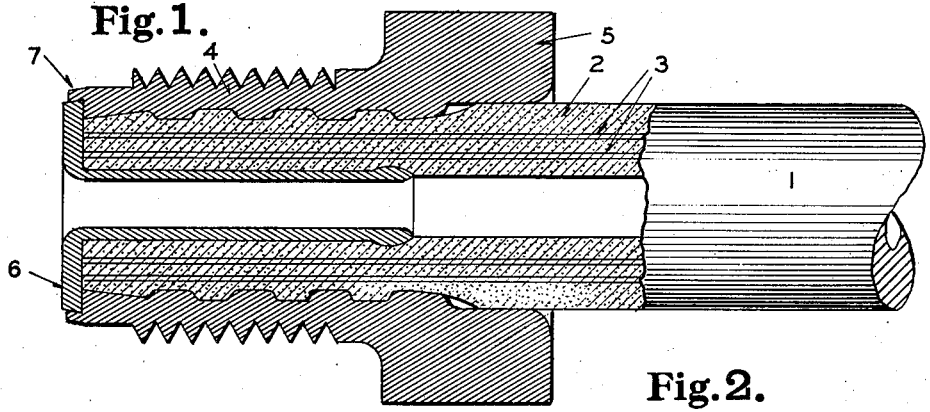
Figure 2:
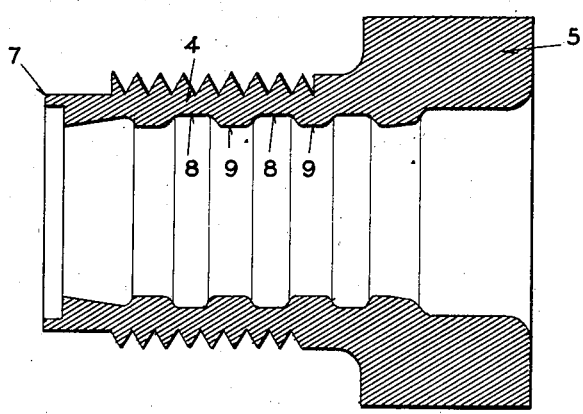
Figure 3:
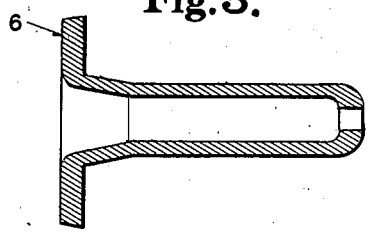
Figure 4:
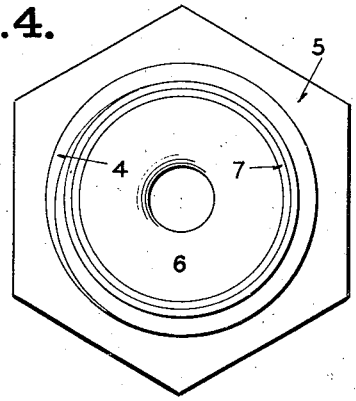

In the accompanying drawings Figure 1 is a cross sectional view illustrating an embodiment of my invention; Figure 2 is a cross sectional view illustrating the sleeve portion of the fitting; Figure 3 is a cross sectional view of the nipple portion of the fitting; and Figure 4 is an end elevational view of the assembled fitting.

The hose 1 is composed of layers of rubber 2 and textile material 3, and is of relatively small bore with the result that it may be of small diameter and yet withstand the liquid pressures applied to it in the operation of the braking apparatus.

The sleeve comprises a body portion 4 and a rearward extension 5, the latter being of hexagonal shape exteriorly. The end of the hose is somewhat reduced in diameter by grinding, and the interior of the sleeve is provided with a plurality of alternate grooves 8 and ridges 9, as indicated in the drawings. The diameter of the hose end which is to be inserted in the sleeve is greater than the diameter of the ridges in the sleeve and the hose is forced into the sleeve under pressure, thus causing the rubber of the outer layer to be exuded into the grooves. The diameter of the bore of the rearward extension 5 of the sleeve is approximately the same or greater than the diameter of the portion of the hose which enters it.

After the hose has been forced into the sleeve the nipple, shown in Figure 3, and which comprises a tubular body having a circular flange 6 at one end, is inserted into the bore of the hose and the body of the nipple is then expanded to the shape shown in Figure 1. This expanding operation develops a very strong pressure between the outer surface of the hose and the sleeve, and between the nipple and the inner surface of the hose, and thus a liquid tight and mechanically strong joint is formed between the parts of the fitting and the hose.

I have provided convenient means for retaining the nipple in the hose, and in proper relation to the sleeve, which comprises the circular flange 7 at the forward end of the sleeve and the tapered periphery of the flange 6 of the nipple, as shown in Figures 1 and 3. When the nipple has been inserted into the hose the flange 7 is rolled down on the tapered periphery of the nipple, thereby permanently holding the nipple in place.

The function of the rearward extension 5 of the sleeve is to prevent cracking of the hose under the bending strain to which it is subjected in service. Without this extension the hose will crack closely adjacent to the point where it is in firm contact with the sleeve. By providing the extension 5, which loosely embraces the hose,—that is, which either does not bear upon it in the normal position of the parts, or has only a light pressure contact with it, and has a larger internal diameter than the portion of the sleeve which is in pressure contact with the hose, I so distribute the bending stresses as to prevent cracking of the hose. This distribution of bending stresses results from the fact that the hose may bend over the rear edges of the opening through the extension, which edges are preferably rounded, as shown, and due to the loose fit and the distance from the rear of the extension to the joint where the hose is firmly held, the rubber may and will stretch at one side and compress at the other throughout a considerable length.

I also prefer that the opening formed by the rearward ridge in the sleeve be flared rearwardly, as shown in the drawings, in order that the pressure at this point of the hose decrease gradually. I have found that with this arrangement the likelihood of cracking of the hose is much less than if the pressure on the hose drops through a small space from a high pressure to no pressure.

Having fully described my invention, what I claim as new and desire to secure by Letters Patent of the United States is:

In combination with a hose, an exteriorly threaded rigid connector embracing the peripheral portion only of the end of the hose, and an expanded tubular clamping member in the bore of the hose and maintaining it in pressure engagement with the connector, said clamping member being provided with a circular head portion of greater diameter than the hose receiving bore of the connector and having a tapered periphery, and said connector being provided with a shoulder portion forming a stop for the head of the clamping member and with a circular extension bent into engagement with the tapered periphery of the head of the clamping member.

In testimony whereof, I hereunto affix my signature, this 19th day of October, 1928.

BURNS DICK.